United States Patent
Endo

(10) Patent No.: US 8,492,941 B2
(45) Date of Patent: Jul. 23, 2013

(54) ROTATING ELECTRIC MACHINE WITH IMPROVED ROTOR SHAFT COOLANT CHANNEL STRUCTURE

(75) Inventor: Yasuhiro Endo, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 199 days.

(21) Appl. No.: 13/119,130

(22) PCT Filed: Oct. 6, 2009

(86) PCT No.: PCT/JP2009/067382
§ 371 (c)(1),
(2), (4) Date: Mar. 15, 2011

(87) PCT Pub. No.: WO2010/050340
PCT Pub. Date: May 6, 2010

(65) Prior Publication Data
US 2011/0169353 A1    Jul. 14, 2011

(30) Foreign Application Priority Data

Oct. 27, 2008   (JP) ................................ 2008-275774

(51) Int. Cl.
*H02K 9/19*    (2006.01)
*H02K 5/20*    (2006.01)
*H02K 9/197*   (2006.01)

(52) U.S. Cl.
USPC ............................. 310/59; 310/60 R; 310/61

(58) Field of Classification Search
USPC ................ 310/52, 54, 58, 59, 60 R, 60 A, 61, 310/63

IPC ................ H02K 5/20,9/19, 9/193, 9/197, 9/20, H02K 9/08
See application file for complete search history.

(56) References Cited

U.S. PATENT DOCUMENTS

| | | | | |
|---|---|---|---|---|
| 3,629,628 A | * | 12/1971 | Rank et al. ................... | 310/54 |
| 4,448,042 A | * | 5/1984 | Yamaguchi et al. ........... | 310/54 |
| 5,550,418 A | * | 8/1996 | Chung ........................... | 310/58 |
| 6,897,581 B2 | * | 5/2005 | Doherty et al. ................ | 310/52 |
| 2007/0120429 A1 | * | 5/2007 | Howard et al. ................ | 310/61 |
| 2007/0273228 A1 | | 11/2007 | Tanaka et al. | |

FOREIGN PATENT DOCUMENTS

| | | |
|---|---|---|
| JP | 09-182375 A | 7/1997 |
| JP | 2002-034189 A | 1/2002 |
| JP | 2002-051503 A | 2/2002 |
| JP | 2004-166492 A | 6/2004 |

(Continued)

*Primary Examiner* — Tran Nguyen
*Assistant Examiner* — Michael Andrews
(74) *Attorney, Agent, or Firm* — Sughrue Mion, PLLC

(57) ABSTRACT

A motor generator serving as a rotating electric machine includes: a rotor; a rotor shaft rotating with the rotor; and end plates and provided at opposite ends, respectively, of the rotor. The rotor shaft has oil channels and provided independently of each other and passing oil therethrough. The end plates and have oil channels and communicating with the oil channels and, respectively, and guiding oil to the rotor. The oil channels and are formed so as to avoid passing oil in a stream having vector components facing one another, as seen in the axial direction of a center axis, on the route of the channels. The oil channels and are formed so as to avoid passing oil in a stream having vector components facing one another, as seen in the axial direction of the center axis, on the route of the channels. The rotating electric machine thus allows the rotor to be cooled uniformly.

12 Claims, 6 Drawing Sheets

FOREIGN PATENT DOCUMENTS

| | | |
|---|---|---|
| JP | 2005-006428 A | 1/2005 |
| JP | 2005-278319 A | 10/2005 |
| JP | 2006-025545 A | 1/2006 |
| JP | 2006-115650 A | 4/2006 |
| JP | 2006-158105 A | 6/2006 |
| JP | 2007-202243 A | 8/2007 |
| JP | 2007-318821 A | 12/2007 |
| JP | 2007-336646 A | 12/2007 |
| JP | 2008-219960 A | 9/2008 |
| WO | 2007-055192 A1 | 5/2007 |

* cited by examiner

ROTATING ELECTRIC MACHINE WITH IMPROVED ROTOR SHAFT COOLANT CHANNEL STRUCTURE

CROSS REFERENCE TO RELATED APPLICATIONS

This application is a National Stage of International Application No. PCT/JP2009/067382 filed Oct. 6, 2009, claiming priority based on Japanese Patent Application No. 2008-275774 filed Oct. 27, 2008, the contents of all of which are incorporated herein by reference in their entirety.

TECHNICAL FIELD

The present invention relates generally to rotating electric machines, and particularly to rotating electric machines including a scheme using oil to cool a rotor.

BACKGROUND ART

For a conventional rotating electric machine, for example, Japanese Patent Laying-open No. 2005-6428 discloses a rotor structure provided in a rotating electric machine for the purpose of cooling a motor's right and left stator coil ends uniformly (Patent Document 1). More specifically, Patent Document 1 discloses a rotor structure including: a rotation shaft coolant oil channel provided internal to a rotation shaft; first and second rotation shaft coolant oil branching channels receiving a coolant oil from the rotation shaft coolant oil channel and branching the oil in a direction perpendicular to the rotation shaft; first and second rotor coolant oil channels provided parallel to the rotation shaft and independent of each other; and first and second rotor end face oil channels provided at the rotor end faces in the form of a circumferential groove.

Furthermore, Japanese Patent Laying-open No. 9-182375 discloses a motor cooling circuit provided to cool a rotor's core to minimize eddy current loss, hysteresis loss and the like to minimize heat generation (Patent Document 2). More specifically, Patent Document 2 discloses a motor cooling circuit including: first and second axial oil channels passing through the core in an axial direction; an axial oil channel provided internal to a rotor shaft; first and second radial oil channels allowing the first and second axial oil channels and the axial oil channel internal to the rotor shaft to communicate with each other, respectively, to guide the oil that passes through the axial oil channel internal to the rotor shaft to the first and second axial oil channels; and a supply means. The supply means supplies oil which is in turn supplied centrifugally from the axial oil channel internal to the rotor shaft to the core and passes through the first and second axial oil channels and thus cools the core.

Furthermore, Japanese Patent Laying-open No. 2007-336646 discloses a rotating electric machine with an improved rotor cooling performance to eliminate the necessity of introducing a coolant chamber at a stator frame or the like and thus allow the rotating electric machine to be produced at a reduced cost in a reduced period of time, formed of a reduced number of components, applied in a wider range, and stabilized in quality (Patent Document 3). Furthermore, Japanese Patent Laying-open No. 2006-158105 discloses a motor cooling device allowing a coolant to be self-circulated in order to achieve a cooling system reduced in size and weight (Patent Document 4).

Furthermore, Japanese Patent Laying-open No. 2004-166492 discloses a vehicular electric motor cooling device preventing a coolant from contacting a magnet of a vehicle driving electric motor and thus degrading/altering the magnet (Patent Document 5). Furthermore, Japanese Patent Laying-open No. 2005-278319 discloses a motored power device configured to cool an electric motor's locally heated portion intensively while achieving reduced power loss (Patent Document 6).

PRIOR ART DOCUMENTS

Patent Documents

Patent Document 1: Japanese Patent Laying-open No. 2005-6428
Patent Document 2: Japanese Patent Laying-open No. 9-182375
Patent Document 3: Japanese Patent Laying-open No. 2007-336646
Patent Document 4: Japanese Patent Laying-open No. 2006-158105
Patent Document 5: Japanese Patent Laying-open No. 2004-166492
Patent Document 6: Japanese Patent Laying-open No. 2005-278319

SUMMARY OF THE INVENTION

Problems to be Solved by the Invention

As described in Patent Document 1, the rotating electric machine has a rotor structure with the rotation shaft coolant oil channel passing a coolant oil, which is branched to the first and second rotation shaft coolant oil branching channels and passed therethrough and thus supplied to the right and left stator coil ends.

In such a rotor structure, however, the first rotor coolant oil channel passes a coolant oil stream along the rotation shaft in a direction opposite to that in which the rotation shaft coolant oil channel passes a coolant oil stream, and the second rotor coolant oil channel passes a coolant oil stream along the rotation shaft in the same direction as the rotation shaft coolant oil channel passes a coolant oil stream. In that case, the coolant oil passing through the rotation shaft coolant oil channel has a kinetic energy internal to the rotation shaft in the direction of its stream, and when the coolant oil branches from the rotation shaft coolant oil channel to the first rotor coolant oil channel, a resistance is caused in the coolant oil stream. As a result, the first and second rotor coolant oil channels supply coolant oil at different flow rates, respectively, and the rotor may not be cooled uniformly.

Furthermore, as disclosed in Patent Document 2, the motor cooling circuit has the first and second radial oil channels branched into the oil's upstream and downstream sides, respectively, in the rotor shaft's axial direction and communicating with the axial oil channel internal to the rotor shaft. In such a configuration, the upstream, first radial oil channel and the downstream, second radial oil channel supply oil at different flow rates, respectively, and the motor may not be cooled uniformly.

The present invention has been made to overcome the above disadvantage and it contemplates a rotating electric machine allowing a rotor to be cooled uniformly.

Means for Solving the Problems

In accordance with the present invention a rotating electric machine includes: a rotor; a shaft extending along an axis of rotation of the rotor and rotating with the rotor; and a first plate and a second plate provided at opposite ends, respectively, of the rotor, as seen in a direction of the axis of rotation of the rotor. The shaft has a first coolant channel and a second coolant channel provided independently of each other, extending in the direction of the axis of rotation of the rotor, and passing a coolant therethrough. The first plate and the second plate have a third coolant channel and a fourth coolant channel communicating with the first coolant channel and the second coolant channel, respectively, and guiding the coolant to the rotor. The first coolant channel and the third coolant channel are formed so as to avoid passing the coolant in a stream having vector components facing one another, as seen in the direction of the axis of rotation of the rotor, on the route of the coolant channels, and the second coolant channel and the fourth coolant channel are formed so as to avoid passing the coolant in a stream having vector components facing one another, as seen in the direction of the axis of rotation of the rotor, on the route of the coolant channels.

The rotating electric machine having the first coolant channel and the second coolant channel provided independently of each other can reduce/prevent a difference caused between a flow rate of the coolant guided from the first coolant channel through the third coolant channel to the rotor and that of the coolant guided from the second coolant channel through the fourth coolant channel to the rotor. Furthermore, the first and third coolant channels formed so as to avoid passing the coolant in a stream having vector components facing one another, as seen in the direction of the axis of rotation of the rotor, and the second and fourth coolant channels formed so as to avoid passing the coolant in a stream having vector components facing one another, as seen in the direction of the axis of rotation of the rotor, can minimize the coolant's flowing resistance in the first and third coolant channels and that in the second and fourth coolant channels, and reduce/prevent a difference caused therebetween. The present invention thus allows the rotor to be cooled uniformly.

Furthermore, preferably, the shaft is cylindrical. The first coolant channel includes a first groove formed at an inner circumferential surface of the shaft and extending in the direction of the axis of rotation of the rotor. The second coolant channel includes a second groove formed at an inner circumferential surface of the shaft, extending in the direction of the axis of rotation of the rotor, and provided about an axis of rotation of the shaft out of phase with the first groove. In the rotating electric machine thus configured, the coolant introduced into the shaft forms a layer and thus covers the shaft's inner circumferential surface centrifugally as the shaft rotates. At the time, the coolant covering the shaft's inner circumferential surface can be distributed into the first groove and the second groove, and the coolant can be passed through the grooves at a uniform flow rate.

Furthermore, preferably, the first coolant channel further includes a first hole penetrating the shaft from the first groove to an outer circumferential surface of the shaft and communicating with the third coolant channel, and the second coolant channel further includes a second hole penetrating the shaft from the second groove to an outer circumferential surface of the shaft and communicating with the fourth coolant channel. The first hole and the second hole are positioned to overlap the first plate and the second plate, respectively, in a direction of the axis of rotation of the shaft. The rotating electric machine thus configured allows the coolant passing through the first groove and that passing through the second groove to be guided through the first hole and the second hole to the third coolant channel and the fourth coolant channel, respectively, centrifugally as the shaft rotates.

Furthermore, preferably, the first coolant channel and the second coolant channel are provided with a reservoir for reserving the coolant on a route of each coolant channel. The rotating electric machine thus configured allows the coolant that is reserved in the reservoir to be guided to the third coolant channel and the fourth coolant channel to prevent the rotor from being cooled inefficiently when the first coolant channel and the second coolant channel receive the coolant in a reduced amount.

Furthermore, preferably, the shaft is cylindrical. The first coolant channel includes a third groove formed at an inner circumferential surface of the shaft and helically extending along the axis of rotation of the rotor. The second coolant channel includes a fourth groove formed at an inner circumferential surface of the shaft, helically extending along the axis of rotation of the rotor, and avoiding crossing the third groove. The rotating electric machine having third and fourth helical grooves can utilize the centrifugal force that is caused as the shaft rotates, to pass the coolant through the first and second coolant channels smoothly.

Furthermore, preferably, the rotating electric machine further includes a bearing supporting the shaft rotatably. The shaft is provided with a fifth coolant channel extending independently of the first coolant channel and the second coolant channel and passing the coolant therethrough for cooling the bearing. The rotating electric machine with a fifth coolant channel extending independently of the first coolant channel and the second coolant channel further ensures that the bearing is supplied with the coolant at a predetermined flow rate.

Furthermore, preferably, a flow rate of the coolant guided through the first coolant channel and the third coolant channel to the rotor and that of the coolant guided through the second coolant channel and the fourth coolant channel to the rotor vary depending on each coolant channel's geometrical variation. The rotating electric machine thus configured can adjust the coolant's flow rate through each coolant channel's geometrical variation.

Effects of the Invention

The present invention can thus provide a rotating electric machine allowing a rotor to be cooled uniformly.

MODES FOR CARRYING OUT THE INVENTION

Hereinafter reference will be made to the drawings to describe the present invention in embodiments. In the figures, identical or corresponding components are identically denoted.

First Embodiment

Figure 1:
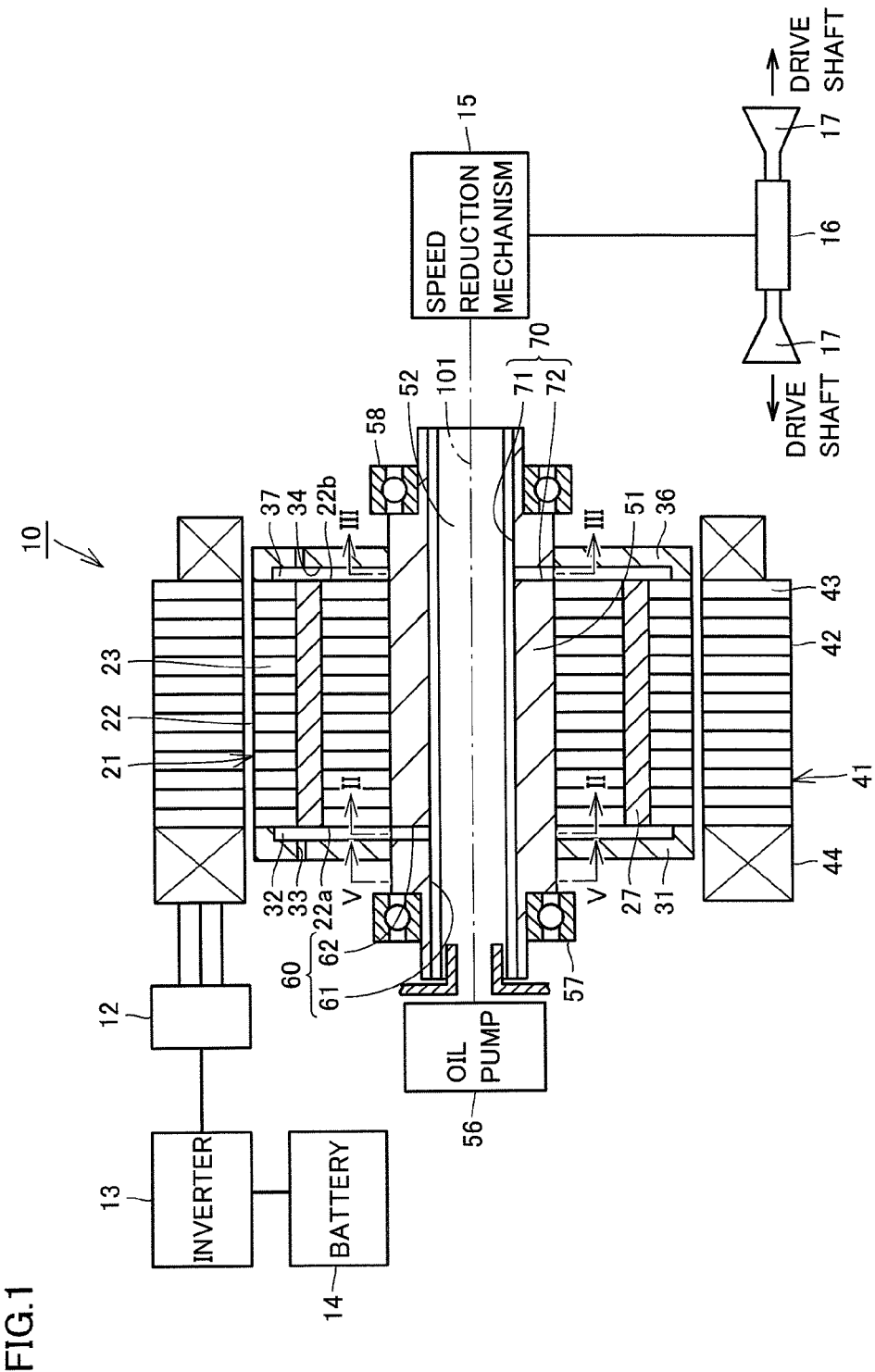
FIG. 1 is a schematic cross section of a vehicular drive unit having a motor generator mounted therein in a first embodiment of the present invention.

FIG. 1 is a schematic cross section of a vehicular drive unit having a motor generator mounted therein in a first embodiment of the present invention. The vehicular drive unit shown in the figure is provided in a hybrid vehicle having as a power source a gasoline engine, a diesel engine or a similar internal combustion engine and a motor receiving electric power from a chargeable/dischargeable secondary battery.

With reference to FIG. 1, initially, the present embodiment provides a rotating electric machine implemented as a motor generator 10 basically structured, as will be described hereinafter. Motor generator 10 includes a rotor 21, a rotor shaft 51 that serves as a shaft extending along a center axis 101 serving as an axis of rotation of rotor 21 and rotates with rotor 21, and an end plate 31 and an end plate 36 serving as a first plate and a second plate, respectively, provided at the opposite ends of rotor 21 as seen in the axial direction of center axis 101.

Rotor shaft 51 is provided with oil channels 60 and 70 serving as first and second coolant channels, respectively, provided independently of each other, extending in the axial direction of center axis 101, and passing a coolant of oil. End plates 31 and 36 are provided with oil channels 32 and 37 serving as third and forth coolant channels communicating oil channels 60 and 70, respectively, and guiding oil to rotor 21. Oil channels 60 and 32 are formed such that on their route the oil stream does not have vector components facing one another, as seen in the axial direction of center axis 101. Oil channels 70 and 37 are formed such that on their route the oil stream does not have vector components facing one another, as seen in the axial direction of center axis 101.

In the present embodiment, motor generator 10 is structured, as will be described hereinafter.

The FIG. 1 vehicular drive unit has motor generator 10. Motor generator 10 is a rotating electric machine that functions as an electric motor or an electric power generator depending on how the hybrid vehicle travels.

Motor generator 10 has rotor shaft 51, rotor 21, and a stator 41. Rotor 21 rotates about a virtual axis, or center axis 101, integrally with rotor shaft 51. Rotor 21 is circumferentially surrounded by stator 41.

Rotor shaft 51 extends in the axial direction of center axis 101. Rotor shaft 51 is a cylinder having a hollow portion 52. Rotor shaft 51 is supported rotatably relative to a casing (not shown) via bearings 57 and 58 spaced as seen in the axial direction of center axis 101. Rotor shaft 51 is connected to a speed reduction mechanism 15 configured including a plurality of gears.

Rotor shaft 51 has one end provided with an oil pump 56. Oil pump 56 is a gear-type oil pump discharging oil as rotor shaft 51 rotates. The oil discharged from oil pump 56 is supplied to hollow portion 52 to cool or lubricate each component of motor generator 10.

The means for supplying hollow portion 52 with oil is not limited to such a pump as shown in the figure; it may be a scheme causing a gear to scrape up oil which is in turn collected in a catching tank and guided by gravity to hollow portion 52.

Rotor 21 is configured including a rotor core 22 and a permanent magnet 27. Rotor core 22 has a geometry extending in the axial direction of center axis 101 cylindrically. Rotor core 22 is formed of a plurality of electromagnetic steel sheets 23 deposited in layers in the axial direction of center axis 101. Rotor core 22 has one and the other end faces 22a and 22b as seen in the direction in which center axis 101 extends. Rotor core 22 has a plurality of permanent magnets 27 embedded therein. The plurality of permanent magnets 27 are spaced circumferentially about center axis 101.

While the present embodiment is described for rotor 21 of the interior permanent magnet (IPM) type having permanent magnet 27 embedded in rotor core 22, the present invention is not limited thereto, and the rotor may for example be of the surface permanent magnet (SPM) type having a surface with a magnet attached thereto.

Motor generator 10 further has end plates 31 and 36. End plate 31, 36 is formed for example of non magnetic material, e.g., aluminum. End plates 31 and 36 are situated at opposites ends, respectively, of the plurality of electromagnetic steel sheets 23 deposited in layers. End plates 31 and 36 cover the rotor core 22 end faces 22a and 22b, respectively, and hold rotor core 22 integrally.

Stator 41 is configured including a stator core 42 and a coil 44. Stator core 42 has a geometry extending in the axial direction of center axis 101 cylindrically. Stator core 42 is formed of a plurality of electromagnetic steel sheets 43 deposited in layers in the axial direction of center axis 101.

Stator core 42 has coil 44 wound thereon. Coil 44 is formed for example of an insulatingly coated copper wire. Coil 44 includes U-, V- and W-phase coils. Terminals corresponding to these phase coils are connected to a terminal mount 12. Terminal mount 12 is electrically connected via an inverter 13 to a battery 14. Inverter 13 receives a direct current electric current from battery 14 and converts it to an alternate current electric current for driving the motor, and also receives an alternate current electric current generated by regenerative braking and converts it to a direct current electric current to charge battery 14.

Motor generator 10 outputs power which is in turn transmitted from speed reduction mechanism 15 through a differential mechanism 16 to a drive shaft receiving unit 17. Drive shaft receiving unit 17 receives the power, which is in turn transmitted via a drive shaft to a wheel (not shown) as torque.

When the hybrid vehicle is regeneratively braked, its wheels are rotated by its vehicular body's inertial force. The wheels' torque drives motor generator 10 via drive shaft receiving unit 17, differential mechanism 16 and speed reduction mechanism 15. At the time, motor generator 10 is operated as an electric power generator. Motor generator 10 generates electric power which is in turn stored via inverter 13 to battery 14.

The FIG. 1 motor generator 10 is cooled by a structure, as will be described hereinafter.

Figure 2:
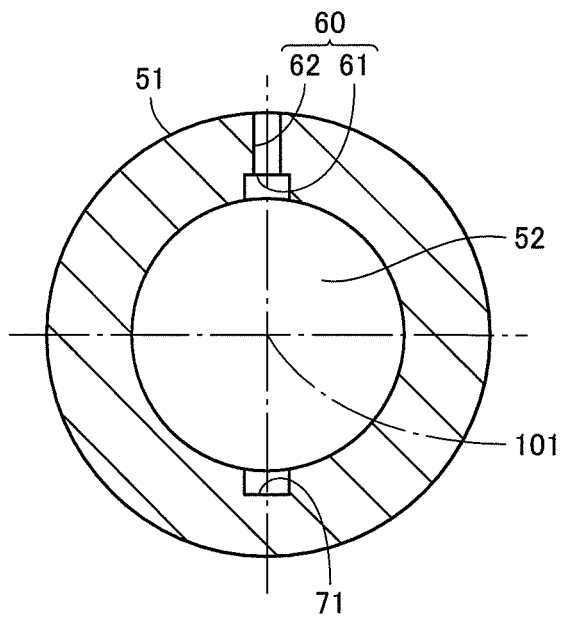
FIG. 2 is a cross section of a rotor shaft taken along a line II-II of FIG. 1.
Figure 3:
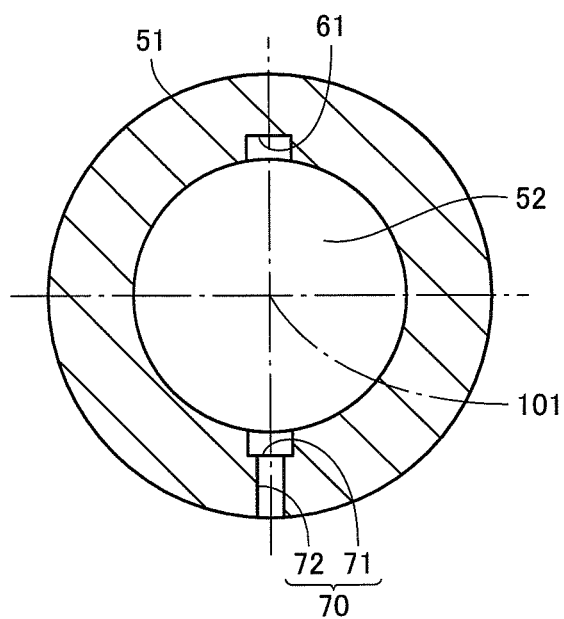
FIG. 3 is a cross section of the rotor shaft taken along a line of FIG. 1.

FIG. 2 is a cross section of the rotor shaft taken along a line II-II of FIG. 1. FIG. 3 is a cross section of the rotor shaft taken along a line III-III of FIG. 1.

With reference to FIG. 2 and FIG. 3, rotor shaft 51 has grooves 61 and 71. Grooves 61 and 71 are formed by receding from an inner circumferential surface of rotor shaft 51 that defines hollow portion 52. Grooves 61 and 71 extend in the axial direction of center axis 101. In the present embodiment, grooves 61 and 71 extend parallel to the axial direction of center axis 101. Grooves 61 and 71 are provided about center axis 101 out of phase with each other. In the present embodiment, grooves 61 and 71 are provided about center axis 101 180° out of phase with each other.

Rotor shaft 51 also has holes 62 and 72. Hole 62 extends from a bottom of groove 61 radially outward with center axis 101 serving as a center, and penetrates rotor shaft 51. Hole 72 extends from a bottom of groove 71 radially outward with center axis 101 serving as a center, and penetrates rotor shaft 51. Holes 62 and 72 are formed at a position allowing the holes to overlap end plates 31 and 36, respectively, as seen in the axial direction of center axis 101.

Thus in the present embodiment rotor shaft 51 has groove 61 and hole 62 formed to configure oil channel 60 and has groove 71 and hole 72 formed to configure oil channel 70. Oil channel 60 and oil channel 70 are formed independently without crossing each other on their routes.

Figure 4:
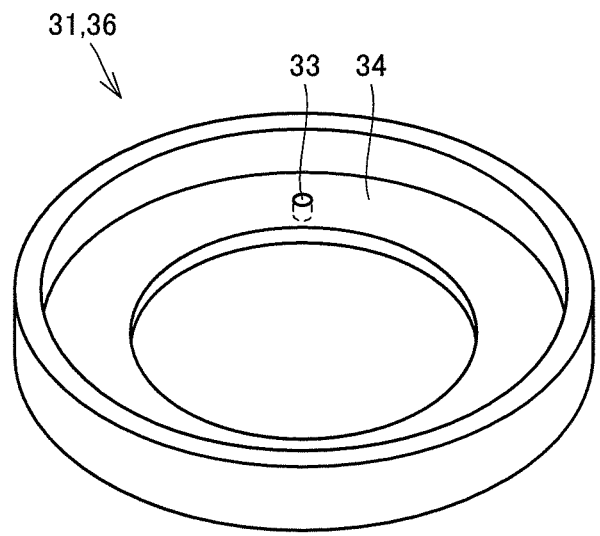
FIG. 4 is a perspective view of an end plate provided to the motor generator shown in FIG. 1.

FIG. 4 is a perspective view of an end plate provided to the motor generator shown in FIG. 1. With reference to FIG. 1 and FIG. 4, end plate 31, 36 is in the form of a ring and has a circumferential groove 34 along its inner circumference. Circumferential groove 34 extends annularly about center axis 101. End plate 31, 36 also has a through hole 33 extending in the axial direction of center axis 101 and communicating with circumferential groove 34.

End plates 31, 36 are attached to rotor core 22 such that their respective circumferential grooves 34 face end faces 22a, 22b. The end plate 31 circumferential groove 34 communicates with hole 62 and the end plate 36 circumferential groove 34 communicates with hole 72.

Thus, in the present embodiment, an inner wall of circumferential groove 34 of end plate 31 and end face 22a of rotor core 22 define a space, which configures oil channel 32, and an inner wall of circumferential groove 34 of end plate 36 and end face 22b of rotor core 22 define a space, which configures oil channel 37. Oil channel 32 communicates with oil channel 60 and oil channel 37 communicates with oil channel 70.

Figure 5:
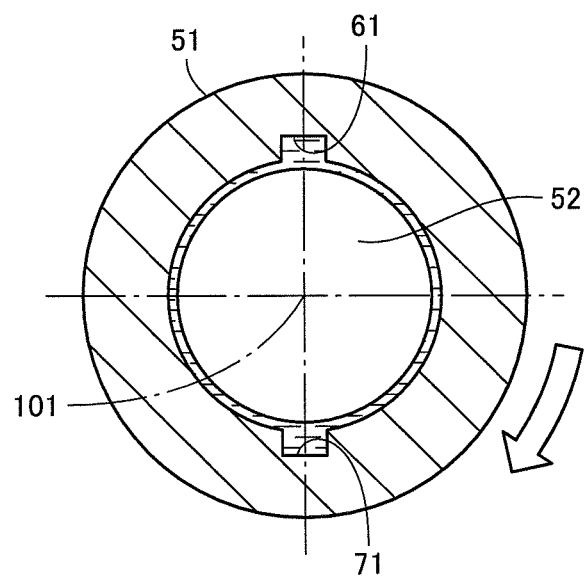
FIG. 5 is a cross section for illustrating how oil flows through the rotor shaft shown in FIG. 1.

FIG. 5 is a cross section for illustrating how oil flows through the rotor shaft shown in FIG. 1. The figure shows a cross section taken along a line V-V shown in FIG. 1.

With reference to FIG. 1 and FIG. 5, oil pump 56 supplies hollow portion 52 with oil, which is passed in the axial direction of center axis 101 by inertial force caused as the oil is supplied to hollow portion 52, while the oil is moved along the inner circumferential surface of rotor shaft 51 that defines hollow portion 52 by centrifugal force caused as rotor shaft 51 rotates. The oil flows through groove 61 and hole 62 into the end plate 31 circumferential groove 34 and cools rotor core 22 and permanent magnet 27 at end face 22a. The oil also flows through groove 71 and hole 72 into the end plate 36 circumferential groove 34 and cools rotor core 22 and permanent magnet 27 at end face 22b. Furthermore, the oil flowing into circumferential groove 34 is jetted through through hole 33 to a coil end portion of coil 44.

In the present embodiment, motor generator 10 has oil filling grooves 61 and 71, and the oil can be passed such that the oil is distributed to each of oil channels 60 and 70 from a point in time at which hollow portion 52 is supplied with the oil. This can reduce/prevent a difference caused between a flow rate of oil supplied to rotor 21 through oil channels 60 and 32 and that of oil supplied to rotor 21 through oil channels 70 and 37.

Furthermore, in the present embodiment, groove 61 provides an oil stream in a single direction along the axial direction of center axis 101 (i.e., in FIG. 1, a direction from the left side to the right side), hole 62 provides an oil stream radially as seen with center axis 101 serving as a center, and the end plate 31 circumferential groove 34 provides an oil stream in a direction in a plane orthogonal to center axis 101 (i.e., radially or circumferentially with center axis 101 serving as a center). Thus, oil channels 60 and 32 do not have an oil stream with vector components facing one another on their route, as seen in the axial direction of center axis 101.

Furthermore, groove 71 provides an oil stream in a single direction along the axial direction of center axis 101 (i.e., in FIG. 1, a direction from the left side to the right side), hole 72 provides an oil stream radially as seen with center axis 101 serving as a center, and the end plate 36 circumferential groove 34 provides an oil stream in a direction in a plane orthogonal to center axis 101 (i.e., radially or circumferentially with center axis 101 serving as a center). Thus, oil channels 70 and 37 do not have an oil stream with vector components facing one another on their route, as seen in the axial direction of center axis 101.

This can minimize oil's flowing resistance in oil channels 60 and 32 and that in oil channels 70 and 37 and reduce/prevent a difference caused therebetween.

Thus the present invention in the first embodiment can provide motor generator 10 having oil channels 60 and 32 and oil channels 70 and 37 passing and supplying oil to rotor 21 at end face 22a and end face 22b, respectively, at a uniform flow rate so that rotor 21 can be cooled with a limited deviation in temperature.

While the present embodiment has been described for the present rotating electric machine applied to a motor generator mounted in a hybrid vehicle, the present invention is not limited to, and the present rotating electric machine may be applied to motors mounted in electric vehicles, general industrial motors and the like.

Second Embodiment

Figure 6:
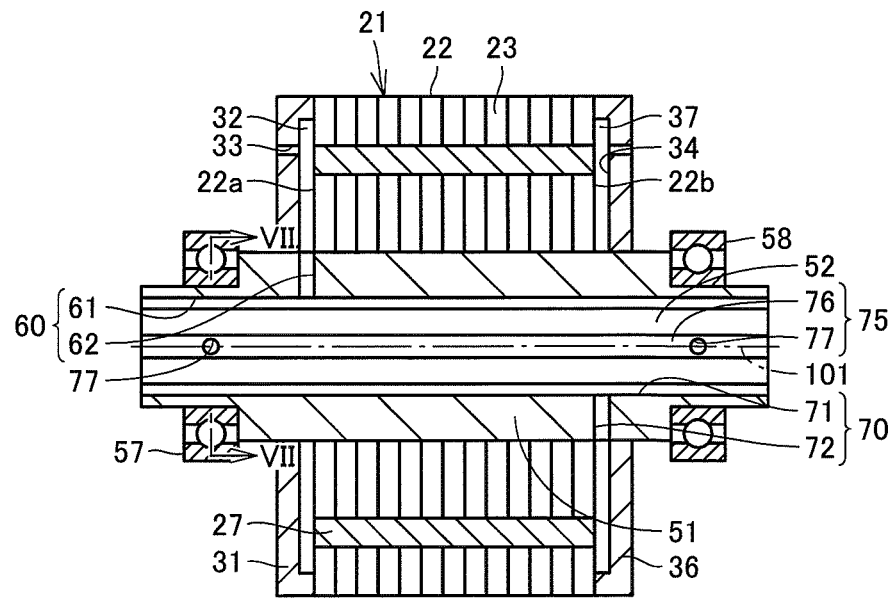
FIG. 6 is a cross section of a motor generator in a second embodiment of the present invention.
Figure 7:
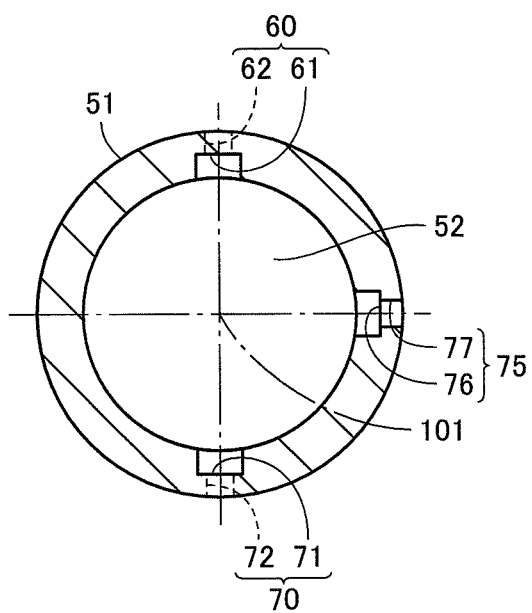
FIG. 7 is a cross section of the rotor shaft taken along a line VII-VII of FIG. 6.

FIG. 6 is a cross section of a motor generator in a second embodiment of the present invention. FIG. 7 is a cross section of the rotor shaft taken along a line VII-VII of FIG. 6. The present embodiment provides the motor generator in a structure basically similar to motor generator 10 of the first embodiment. Hereinafter, their identical structures will not be described repeatedly.

With reference to FIG. 6 and FIG. 7, the present embodiment provides a motor generator having rotor shaft 51 further provided with an oil channel 75.

The structure will be described more specifically. Rotor shaft 51 has a groove 76. Groove 76 is formed by receding from the inner circumferential surface of rotor shaft 51 that defines hollow portion 52. Groove 76 extends in the axial direction of center axis 101. Groove 76 and grooves 61 and 71 are provided about center axis 101 out of phase with each other. In the present embodiment, groove 76 is provided about center axis 101 90° out of phase with grooves 61 and 71.

Rotor shaft 51 has a hole 77. Hole 77 extends from a bottom of groove 76 radially outward with center axis 101 serving as a center, and penetrates rotor shaft 51. Hole 77 is formed at a position allowing the hole to overlap bearing 57 and bearing 58 as seen in the axial direction of center axis 101.

Thus in the present embodiment rotor shaft 51 has groove 76 and hole 77 formed to configure oil channel 75. The oil supplied from oil pump 56 shown in FIG. 1 fills grooves 61, 71 and 76, and the oil can be passed such that the oil is distributed to each of oil channels 60, 70 and 75 from a point in time at which hollow portion 52 is supplied with the oil.

Thus the present invention in the second embodiment provides a motor generator that can similarly provide the effect described in the first embodiment. In addition, the present embodiment provides rotor shaft 51 with oil channel 75 to ensure that a predetermined amount of oil can be supplied to bearings 57, 58. This can prevent bearings 57, 58 from seizure and make the vehicular drive unit more reliable.

Furthermore, each oil channel can be varied geometrically, (i.e., have a groove varied in width, depth and the like and a hole varied in diameter and the like) for example to supply rotor 21 with oil at an increased flow rate and supply bearings 57, 58 with oil at a reduced flow rate.

Third Embodiment

Figure 8:
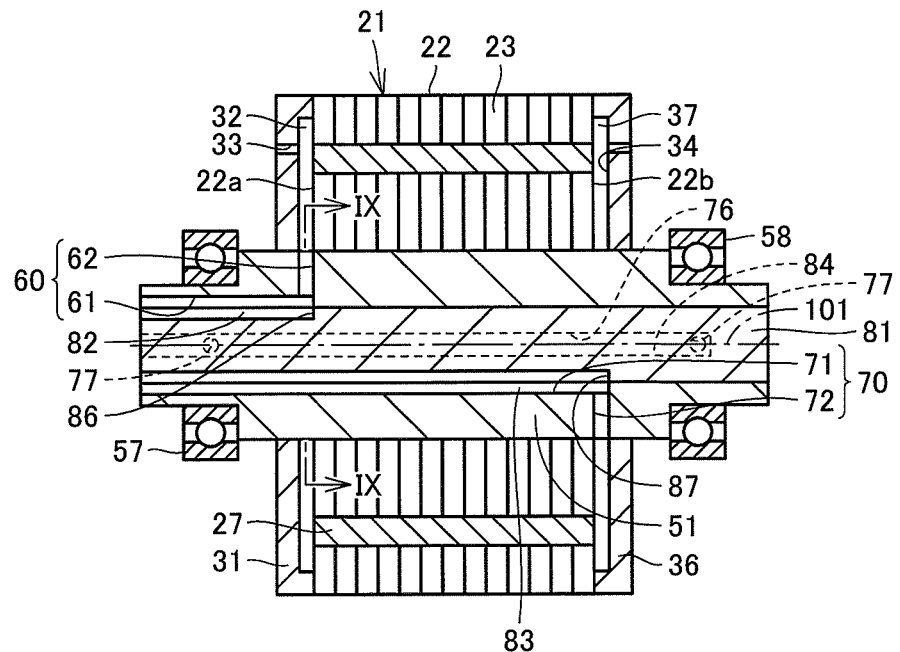
FIG. 8 is a cross section of a motor generator in a third embodiment of the present invention.
Figure 9:
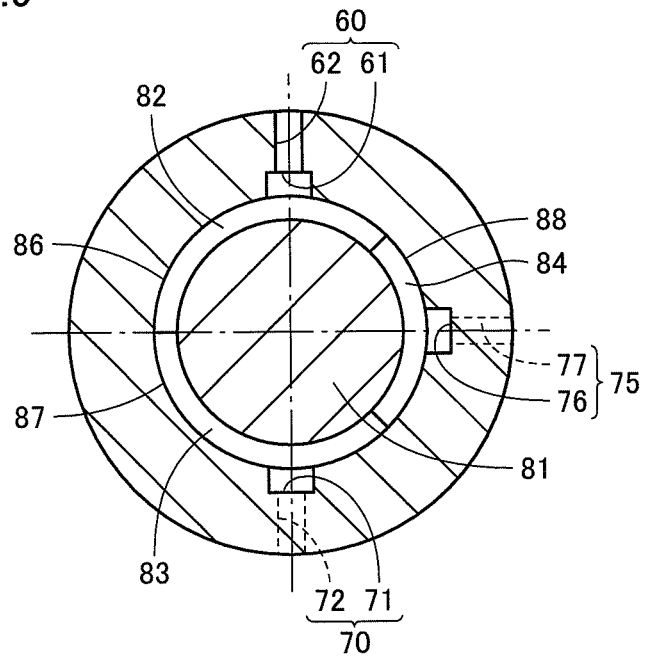
FIG. 9 is a cross section of the motor generator taken along a line IX-IX of FIG. 8.

FIG. 8 is a cross section of a motor generator in a third embodiment of the present invention. FIG. 9 is a cross section of the motor generator taken along a line IX-IX of FIG. 8. The present embodiment provides the motor generator in a structure basically similar to the motor generator of the second embodiment. Hereinafter, their identical structures will not be described repeatedly.

With reference to FIG. 8 and FIG. 9, the present embodiment provides a motor generator with oil channels 60, 70 and 75 having oil reservoirs 82, 83 and 84, respectively, for reserving oil on their respective routes.

The present embodiment provides the motor generator with a channel forming member 81. Channel forming member 81 is inserted in hollow portion 52.

Grooves 61 and 71 extend in the axial direction of center axis 101 from one end of rotor shaft 51 to the locations of holes 62 and 72, respectively. Groove 76 extends in the axial direction of center axis 101 from one end of rotor shaft 51 to the location of hole 77 communicating with bearing 58.

Figure 10:
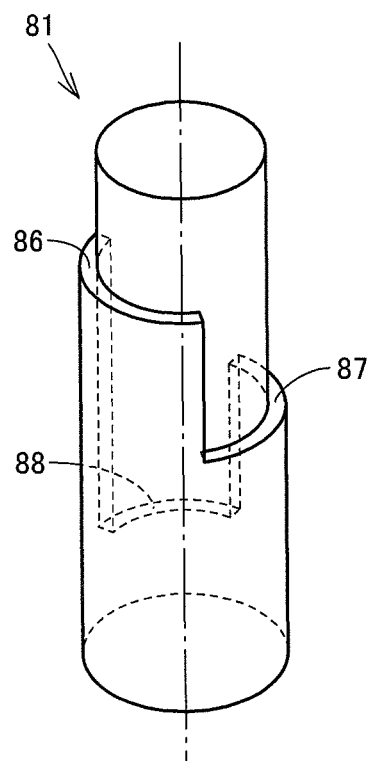
FIG. 10 is a perspective view of a channel forming member provided to the motor generator shown in FIG. 8.

FIG. 10 is a perspective view of a channel forming member provided to the motor generator shown in FIG. 8. With reference to FIG. 8 to FIG. 10, channel forming member 81 is a solid bar and has an outer circumferential surface provided with a radial step by steps 86, 87, 88. Steps 86, 87, 88 are provided about the axis of channel forming member 81 in phase ranges, respectively, offset from each other and positionally corresponding to grooves 61, 71, 76 of rotor shaft 51.

Groove 61 having a closed end and the channel forming member 81 step 86 configure oil reservoir 82. Groove 71 having a closed end and the channel forming member 81 step 87 configure oil reservoir 83. Groove 76 having a closed end and the channel forming member 81 step 88 configure oil reservoir 84.

Thus the present invention in the third embodiment provides a motor generator that can similarly provide the effect described in the first and second embodiments. In addition, in the present embodiment, when oil is supplied in a reduced amount or intermittently or the like (e.g., when the hybrid vehicle travels slowly), the oil reserved in oil reservoirs 82, 83, 84 can be guided to rotor 21 to avoid cooling it inefficiently.

While in the present embodiment channel forming member 81 is provided in hollow portion 52, the present invention is not limited to, and oil reservoirs 82, 83, 84 may be configured in a configuration simply terminating grooves 61, 71, 76 at the locations of holes 62, 72, 77.

Fourth Embodiment

Figure 11:
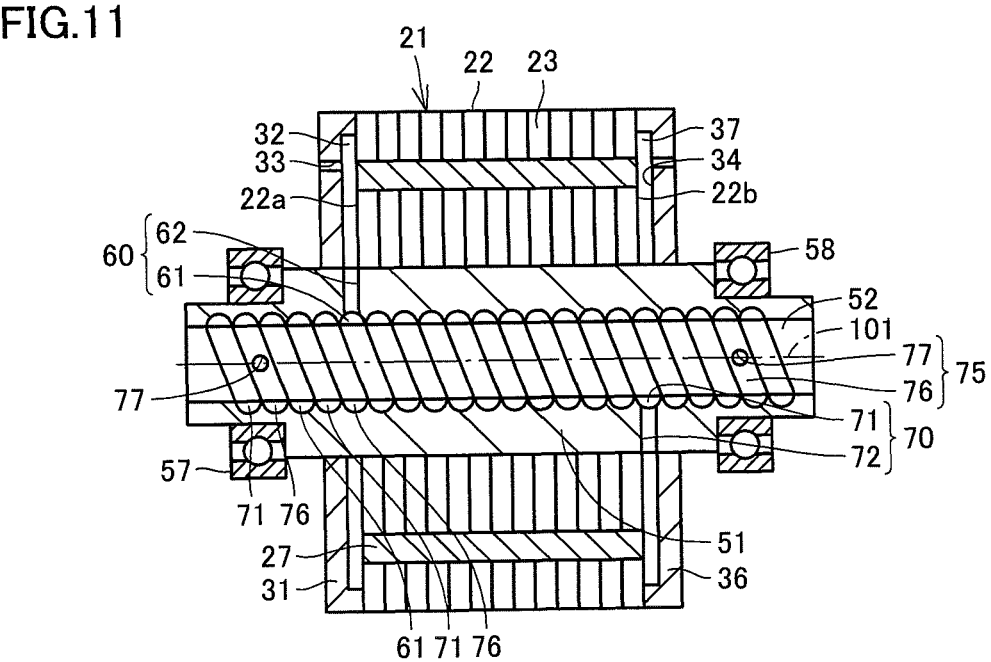
FIG. 11 is a cross section of a motor generator in a fourth embodiment of the present invention.

FIG. 11 is a cross section of a motor generator in a fourth embodiment of the present invention. The present embodiment provides the motor generator in a structure basically similar to motor generator 10 of the second embodiment. Hereinafter, their identical structures will not be described repeatedly.

With reference to FIG. 11, the present embodiment provides a motor generator with grooves 61, 71 and 76 helically extending about center axis 101. Grooves 61, 71 and 76 are offset from each other by a predetermined pitch in the axial direction of center axis 101 (i.e., in a form of multiple-start thread for a screw). Grooves 61, 71 and 76 are formed to overlap the locations where holes 62, 72 and 77 open at the inner circumferential surface of rotor shaft 51.

Thus the present invention in the fourth embodiment provides a motor generator that can similarly provide the effects described in the first and second embodiments. In addition, the present embodiment, providing helical grooves 61, 71 and 76, allows oil to be supplied smoothly if oil pump 56 of FIG. 1 is not provided.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is mainly applied to vehicular drive units having a motor generator mounted therein.

DESCRIPTION OF THE REFERENCE SIGNS

10: motor generator; 21: rotor; 31, 36: end plate; 32, 37, 60, 70, 75: oil channel; 51: rotor shaft; 57, 58: bearing; 61, 71, 76: groove; 62, 72, 77: hole; 82, 83, 84: oil reservoir; 101: center axis.

The invention claimed is:

1. A rotating electric machine comprising:
a rotor;
a shaft extending along an axis of rotation of said rotor and rotating with said rotor; and
a first plate and a second plate provided at opposite ends, respectively, of said rotor, as seen in a direction of the axis of rotation of said rotor,
said shaft having a first coolant channel and a second coolant channel provided independently of each other, extending in the direction of the axis of rotation of said rotor, and passing a coolant therethrough,
said first plate and said second plate having a third coolant channel and a fourth coolant channel communicating with said first coolant channel and said second coolant channel, respectively, and guiding the coolant to said rotor,
said first coolant channel and said third coolant channel being formed so as to avoid passing the coolant in a stream having vector components facing one another, as seen in the direction of the axis of rotation of said rotor, on a route of said first coolant channel and said third coolant channel, said second coolant channel and said fourth coolant channel being formed so as to avoid passing the coolant in a stream having vector components facing one another, as seen in the direction of the axis of rotation of said rotor, on a route of said second coolant channel and said fourth coolant channel,
said shaft being cylindrical,
said first coolant channel including a first groove formed at an inner circumferential surface of said shaft and extending in the direction of the axis of rotation of said rotor,
said second coolant channel including a second groove formed at an inner circumferential surface of said shaft, extending in the direction of the axis of rotation of said rotor, and provided about an axis of rotation of said shaft out of phase with said first groove.

2. The rotating electric machine according to claim 1, wherein:
said first coolant channel further includes a first hole penetrating said shaft from said first groove to an outer circumferential surface of said shaft and communicating with said third coolant channel, and said second coolant channel further includes a second hole penetrating said shaft from said second groove to an outer circumferential surface of said shaft and communicating with said fourth coolant channel; and
said first hole and said second hole are positioned to overlap said first plate and said second plate, respectively, in a direction of the axis of rotation of said shaft.

3. The rotating electric machine according to claim 1, wherein said first coolant channel and said second coolant channel are provided with a reservoir for reserving the coolant on a route of each coolant channel.

4. The rotating electric machine according to claim 1, further comprising a bearing supporting said shaft rotatably, wherein said shaft is provided with a fifth coolant channel extending independently of said first coolant channel and said second coolant channel and passing the coolant therethrough for cooling said bearing.

5. The rotating electric machine according to claim 1, wherein a flow rate of the coolant guided through said first coolant channel and said third coolant channel to said rotor and that of the coolant guided through said second coolant channel and said fourth coolant channel to said rotor vary depending on each coolant channel's geometrical variation.

6. A rotating electric machine comprising:
a rotor;
a shaft extending along an axis of rotation of said rotor and rotating with said rotor; and
a first plate and a second plate provided at opposite ends, respectively, of said rotor, as seen in a direction of the axis of rotation of said rotor,
said shaft having a first coolant channel and a second coolant channel provided independently of each other, extending in the direction of the axis of rotation of said rotor, and passing a coolant therethrough,
said first plate and said second plate having a third coolant channel and a fourth coolant channel communicating with said first coolant channel and said second coolant channel, respectively, and guiding the coolant to said rotor,
said first coolant channel and said third coolant channel being formed so as to avoid passing the coolant in a stream having vector components facing one another, as seen in the direction of the axis of rotation of said rotor, on a route of said first coolant channel and said third coolant channel, said second coolant channel and said fourth coolant channel being formed so as to avoid passing the coolant in a stream having vector components facing one another, as seen in the direction of the axis of rotation of said rotor, on a route of said second coolant channel and said fourth coolant channel,
said shaft being cylindrical,
said first coolant channel including a third groove formed at an inner circumferential surface of said shaft and helically extending along the axis of rotation of said rotor,
said second coolant channel including a fourth groove formed at an inner circumferential surface of said shaft, helically extending along the axis of rotation of said rotor, and avoiding crossing said third groove.

7. The rotating electric machine according to claim 6, further comprising a bearing supporting said shaft rotatably, wherein said shaft is provided with a fifth coolant channel extending independently of said first coolant channel and said second coolant channel and passing the coolant therethrough for cooling said bearing.

8. The rotating electric machine according to claim 6, wherein a flow rate of the coolant guided through said first coolant channel and said third coolant channel to said rotor and that of the coolant guided through said second coolant channel and said fourth coolant channel to said rotor vary depending on each coolant channel's geometrical variation.

9. A rotating electric machine comprising:
a rotor;
a shaft extending along an axis of rotation of said rotor and rotating with said rotor;
a first plate and a second plate provided at opposite ends, respectively, of said rotor, as seen in a direction of the axis of rotation of said rotor,
said shaft having a first coolant channel and a second coolant channel provided independently of each other, extending in the direction of the axis of rotation of said rotor, and passing a coolant therethrough,
said first plate and said second plate having a third coolant channel and a fourth coolant channel communicating with said first coolant channel and said second coolant channel, respectively, and guiding the coolant to said rotor,
said first coolant channel and said third coolant channel being formed so as to avoid passing the coolant in a stream having vector components facing one another, as seen in the direction of the axis of rotation of said rotor, on a route of said first coolant channel and said third coolant channel, said second coolant channel and said fourth coolant channel being formed so as to avoid passing the coolant in a stream having vector components facing one another, as seen in the direction of the axis of rotation of said rotor, on a route of said second coolant channel and said fourth coolant channel; and
a bearing supporting said shaft rotatably, said shaft being provided with a fifth coolant channel extending independently of said first coolant channel and said second coolant channel and passing the coolant therethrough for cooling said bearing,
wherein:
said shaft is cylindrical;
said first coolant channel includes a first groove formed at an inner circumferential surface of said shaft and extending in the direction of the axis of rotation of said rotor; and
said second coolant channel includes a second groove formed at an inner circumferential surface of said shaft, extending in the direction of the axis of rotation of said rotor, and provided about an axis of rotation of said shaft out of phase with said first groove.

10. The rotating electric machine according to claim 9, wherein:
said first coolant channel further includes a first hole penetrating said shaft from said first groove to an outer circumferential surface of said shaft and communicating with said third coolant channel, and said second coolant channel further includes a second hole penetrating said shaft from said second groove to an outer circumferential surface of said shaft and communicating with said fourth coolant channel; and said first hole and said second hole are positioned to overlap said first plate and said second plate, respectively, in a direction of the axis of rotation of said shaft.

11. The rotating electric machine according to claim 9, wherein said first coolant channel and said second coolant channel are provided with a reservoir for reserving the coolant on a route of each coolant channel.

12. The rotating electric machine according to claim 9, wherein a flow rate of the coolant guided through said first coolant channel and said third coolant channel to said rotor and that of the coolant guided through said second coolant channel and said fourth coolant channel to said rotor vary depending on each coolant channel's geometrical variation.

\* \* \* \* \*